(12) United States Patent
Felmlee

(10) Patent No.: US 9,607,502 B1
(45) Date of Patent: Mar. 28, 2017

(54) REAL-TIME INCIDENT CONTROL AND SITE MANAGEMENT

(71) Applicant: SwiftReach Networks, Inc., Mahwah, NJ (US)

(72) Inventor: Nicholas Felmlee, Saddle River, NJ (US)

(73) Assignee: SWIFTREACH NETWORKS, INC., Mahwah, NJ (US)

( * ) Notice: Subject to any disclaimer, the term of this patent is extended or adjusted under 35 U.S.C. 154(b) by 0 days.

(21) Appl. No.: 14/305,510

(22) Filed: Jun. 16, 2014

Related U.S. Application Data

(60) Provisional application No. 61/932,507, filed on Jan. 28, 2014.

(51) Int. Cl.
| | | |
|---|---|---|
| *G08B 9/00* | (2006.01) | |
| *G08B 27/00* | (2006.01) | |
| *G08B 25/01* | (2006.01) | |
| *H04W 68/00* | (2009.01) | |
| *G08B 21/02* | (2006.01) | |
| *H04W 4/00* | (2009.01) | |
| *G08B 21/18* | (2006.01) | |

(52) U.S. Cl.
CPC ............. *G08B 27/00* (2013.01); *G08B 21/02* (2013.01); *G08B 21/0277* (2013.01); *G08B 21/18* (2013.01); *G08B 25/016* (2013.01); *G08B 27/006* (2013.01); *H04W 4/006* (2013.01); *H04W 68/00* (2013.01)

(58) Field of Classification Search
CPC ........ G08B 7/06; G08B 27/005; G08B 27/00; G08B 27/006; G08B 25/016; G08B 21/18; G08B 21/02; G08B 21/0277; H04W 4/006; H04W 68/00
See application file for complete search history.

(56) References Cited

U.S. PATENT DOCUMENTS

| | | | | |
|---|---|---|---|---|
| 5,109,399 A | * | 4/1992 | Thompson | H04M 11/04 340/286.14 |
| 5,732,510 A | * | 3/1998 | Sutton | A62B 13/00 109/1 S |
| 6,225,906 B1 | * | 5/2001 | Shore | G08B 21/0238 340/10.5 |
| 6,281,790 B1 | * | 8/2001 | Kimmel | G08B 13/19608 340/506 |
| 6,339,709 B1 | * | 1/2002 | Gladwin | G01S 5/02 342/465 |
| 6,377,162 B1 | * | 4/2002 | Delestienne | G06F 19/3412 340/286.07 |

(Continued)

*Primary Examiner* — Joseph Feild
*Assistant Examiner* — Rufus Point
(74) *Attorney, Agent, or Firm* — Perkins Coie LLP

(57) ABSTRACT

Embodiments of a system are disclosed for real-time incident control and site management, which enables update-to-date monitoring of every location of a multi-unit site and efficient direction of operations on a site-wide basis. The system communicates with parties onsite via text messaging or similar means, analyzes the communication to determine a status for each unit of the site, and presents a graphical overview of the site with the status information, which allows a commander using the system to control the actions of the parties onsite in an efficient and effective manner. The system also coordinates with support agencies, such as law enforcement agencies, to facilitate assistance of the parties onsite.

21 Claims, 14 Drawing Sheets

(56) References Cited

U.S. PATENT DOCUMENTS

| | | | | |
|---|---|---|---|---|
| 6,400,265 B1* | 6/2002 | Saylor | G08B 13/19602 | 340/506 |
| 6,661,340 B1* | 12/2003 | Saylor | G08B 25/016 | 340/3.3 |
| 6,965,816 B2* | 11/2005 | Walker | B64C 13/20 | 244/189 |
| 7,034,678 B2* | 4/2006 | Burkley | G01S 5/0027 | 340/539.11 |
| 7,145,457 B2* | 12/2006 | Spitz | G06K 17/00 | 340/286.02 |
| 7,183,907 B2* | 2/2007 | Simon | G08B 13/19682 | 340/10.1 |
| 7,228,429 B2* | 6/2007 | Monroe | G08B 25/085 | 713/182 |
| 7,400,249 B2* | 7/2008 | Monroe | G08B 21/0269 | 340/539.12 |
| 7,443,298 B2* | 10/2008 | Cole | G06Q 10/08 | 119/712 |
| 7,460,020 B2* | 12/2008 | Reyes | G08B 7/06 | 340/506 |
| 7,588,126 B2* | 9/2009 | Siikonen | B66B 5/022 | 187/313 |
| 7,642,909 B2* | 1/2010 | Acar | G08B 25/003 | 340/539.1 |
| 7,859,396 B2* | 12/2010 | Monroe | G08B 25/085 | 340/506 |
| 8,024,330 B1* | 9/2011 | Franco | G06F 17/30 | 707/724 |
| 8,228,176 B2* | 7/2012 | Lewis | G08B 7/066 | 340/286.01 |
| 8,234,704 B2* | 7/2012 | Ghai | G06F 21/55 | 726/16 |
| 8,314,683 B2* | 11/2012 | Pfeffer | G08B 25/006 | 340/539.13 |
| 8,332,063 B2* | 12/2012 | Moshier | G06Q 10/06 | 307/326 |
| 8,427,297 B1* | 4/2013 | Markey | G08B 7/06 | 340/3.1 |
| 8,494,121 B1* | 7/2013 | Barnett | H04M 3/5116 | 379/37 |
| 8,559,913 B2* | 10/2013 | Thijs | G08B 25/016 | 455/404.1 |
| 8,624,727 B2* | 1/2014 | Saigh | H04W 4/025 | 340/539.1 |
| 8,688,375 B2* | 4/2014 | Funk | G01C 21/165 | 340/995.19 |
| 8,884,751 B2* | 11/2014 | Baldocchi | G08B 21/043 | 340/539.11 |
| 8,890,685 B1* | 11/2014 | Sookman | H04W 4/22 | 340/539.13 |
| 9,112,996 B2* | 8/2015 | Klaban | B60R 25/33 | |
| 2003/0169181 A1* | 9/2003 | Taylor | G08G 1/0965 | 340/902 |
| 2003/0234725 A1* | 12/2003 | Lemelson | G08B 7/066 | 340/521 |
| 2004/0174264 A1* | 9/2004 | Reisman | G07C 1/10 | 340/573.4 |
| 2005/0091368 A1* | 4/2005 | Ozburn | G06Q 10/10 | 709/224 |
| 2005/0165616 A1* | 7/2005 | Ellis | G06Q 10/10 | 340/539.13 |
| 2005/0197775 A1* | 9/2005 | Smith | G08B 21/10 | 702/3 |
| 2007/0008099 A1* | 1/2007 | Kimmel | A62C 99/00 | 340/506 |
| 2007/0096894 A1* | 5/2007 | Lemmon | G08B 25/14 | 340/506 |
| 2007/0132844 A1* | 6/2007 | Katz | G06Q 20/208 | 348/140 |
| 2008/0001735 A1* | 1/2008 | Tran | G06F 19/3418 | 340/539.22 |
| 2008/0016366 A1* | 1/2008 | Monroe | G08B 25/085 | 713/182 |
| 2008/0048851 A1* | 2/2008 | Reyes | G08B 7/06 | 340/506 |
| 2008/0122609 A1* | 5/2008 | Mannisto | G08B 19/005 | 340/500 |
| 2009/0079575 A1* | 3/2009 | Bouressa | G07C 9/00111 | 340/573.4 |
| 2009/0207852 A1* | 8/2009 | Greene | H04W 28/14 | 370/465 |
| 2009/0284348 A1* | 11/2009 | Pfeffer | G08B 25/006 | 340/7.3 |
| 2010/0245083 A1* | 9/2010 | Lewis | G08B 7/066 | 340/540 |
| 2011/0117878 A1* | 5/2011 | Barash | G08B 21/0211 | 455/404.2 |
| 2011/0275388 A1* | 11/2011 | Haney | H04W 12/08 | 455/456.3 |
| 2011/0276326 A1* | 11/2011 | Fumarolo | H04M 3/42187 | 704/235 |
| 2012/0218127 A1* | 8/2012 | Kroen | G08G 5/0034 | 340/945 |
| 2013/0147604 A1* | 6/2013 | Jones, Jr. | G08B 7/066 | 340/6.1 |
| 2013/0183924 A1* | 7/2013 | Saigh | H04W 4/025 | 455/404.2 |
| 2013/0214925 A1* | 8/2013 | Weiss | G08B 25/001 | 340/539.11 |
| 2014/0025394 A1* | 1/2014 | Aoki | G06Q 10/063114 | 705/2 |
| 2014/0118140 A1* | 5/2014 | Amis | G08B 25/08 | 340/539.13 |
| 2014/0139681 A1* | 5/2014 | Jones, Jr. | G08B 13/19645 | 348/159 |
| 2014/0244294 A1* | 8/2014 | Emanuel | G06F 19/3418 | 705/3 |
| 2014/0266718 A1* | 9/2014 | Bongberg | A61N 1/3993 | 340/540 |
| 2014/0368601 A1* | 12/2014 | deCharms | H04W 4/021 | 348/14.02 |
| 2015/0044983 A1* | 2/2015 | Nasir | H04W 4/22 | 455/404.2 |
| 2015/0124087 A1* | 5/2015 | Jones, Jr. | G08B 13/19695 | 348/143 |
| 2015/0160328 A1* | 6/2015 | Peinhardt | G01S 5/0036 | 455/456.3 |
| 2015/0248824 A1* | 9/2015 | Kamalakannan | G08B 21/02 | 340/539.13 |
| 2017/0004694 A1* | 1/2017 | Dodson | G08B 25/006 | |

* cited by examiner

- <u>Room</u> – This first step is used to identify the current location of the staff member.

| Request: | Please enter the room number of the room you are in: |
  |---|---|
  | Response: | 214 |

401

- <u>Injured</u> – The second step requests the number of injured people in the current room.

| Request: | Please enter the number of persons injured in your current room: |
  |---|---|
  | Response: | 5 |

402

- <u>Count</u> – This third step is used to provide an estimated count of students and staff who are currently in the same room.

| Request: | Please enter the current number of persons (including injured) in your room: |
  |---|---|
  | Response: | 17 |

403

- <u>Status</u> – This last step is used to give an indication of the situation in the room. The following predefined descriptors are supported: Unknown, Secured, Hazard, Critical.

| Request: | Enter Room Status: 1. Secured, 2. Hazard, 3. Critical |
  |---|---|
  | Response: | 2 |

| Building Accountability List | | | | |
|---|---|---|---|---|
| Name | Triage Status | Building | Floor | Room |
| Michael | [Red] - Immediate | 1 - Building 1 | 2 - Floor 2 | 202 - Classroom |
| Rob | [Red] - Immediate | 1 - Building 1 | 2 - Floor 2 | 223 - Auditorium |
| Kevin | [Grey] - Unknown | 1 - Building 1 | 1 - Floor 1 | 115 - Wellness Center |
| Lauren | [Grey] - Unknown | 1 - Building 1 | Unknown | Unknown |
| Bob | [Grey] - Unknown | 1 - Building 1 | 2 - Floor 2 | 234 - Tech Lab |
| Jeff | [Grey] - Unknown | 1 - Building 1 | Unknown | Unknown |
| Karen | [Grey] - Unknown | 1 - Building 1 | Unknown | Unknown |
| Nick | [Grey] - Unknown | 1 - Building 1 | 2 - Floor 2 | 208 - Music |
| Martin | [Grey] - Unknown | 1 - Building 1 | 1 - Floor 1 | 101 - Mechanical |
| Kelly | [Grey] - Unknown | 1 - Building 1 | Unknown | Unknown |
| Keith | [Grey] - Unknown | 1 - Building 1 | Unknown | Unknown |

REAL-TIME INCIDENT CONTROL AND SITE MANAGEMENT

CROSS-REFERENCE TO RELATED APPLICATIONS

This application claims priority to U.S. Provisional Patent Application No. 61/932,507 filed Jan. 28, 2014, which is incorporated herein by reference in its entirety for all purposes.

TECHNICAL FIELD

This patent application generally relates to incident control and site management, and more specifically to providing a management system with web-based user interfaces to facilitate communication with parties located onsite and other support members as well as management of onsite operations.

BACKGROUND

When a site, such as a sports complex or a school, is physically expansive, it could be difficult to manage all operations at the site in real time. Such management could be especially challenging yet critical when a scheduled event or an unexpected incident is taking place across the site, such as a baseball tournament or a gunman shooting. It would therefore be useful to be able to monitor the status of every location onsite in real time and direct the operations on a site-wide basis in an efficient and comprehensive manner.

BASIC DESCRIPTION OF THE DRAWINGS

The techniques introduced here may be better understood by referring to the following Detailed Description in conjunction with the accompanying drawings, in which like reference numerals indicate identical or functionally similar elements:

FIG. 4 is a diagram illustrating an example communication protocol for check-in.

FIG. 5 is a user interface diagram illustrating an example user interface for managing a trigger for an incident.

FIG. 10 is a user interface diagram illustrating an example user interface for managing an accountability list.

Figure 1:
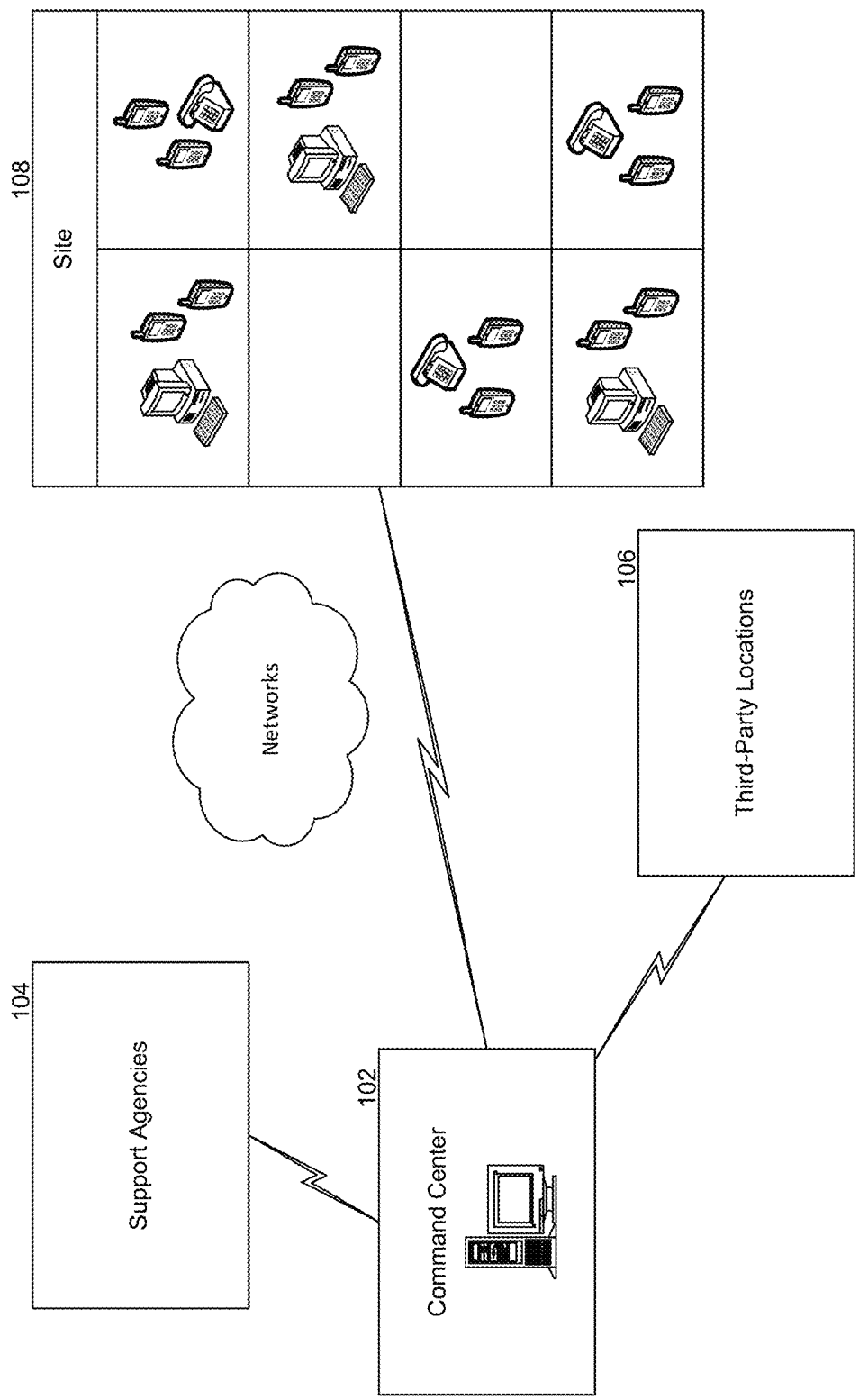
FIG. 1 is an environment diagram illustrating an example environment where a system for real-time incident control and site management can be implemented.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

According to various embodiments disclosed in the present application, a system for real-time incident control and site management enables update-to-date monitoring of every location of a site and efficient direction of operations on a site-wide basis. The system may be used for day-to-day management of a site or for the handling of scheduled events and unexpected incidents onsite.

As an incident occurs at a site, the system communicates with parties onsite via text messaging or similar means, analyzes the communication to determine a status for each unit of the site, and presents a graphical overview of the site with the status information, which allows a commander using the system to control the actions of the parties onsite in an efficient and effective manner. Based on ongoing communication, the system refreshes the graphical overview of the site with updated status information. As an example, as a shooting occurs at a school, the system communicates with the teachers, students, staff members, and other people who are on the school ground via text messaging or similar means. It analyzes the text messages and other information received from the people onsite to assess the status of each room and space of the school, such as whether the shooter is present and how many are injured. The system then presents a graphical overview of the school indicating the status of each room and space, which enables the proper allocation of support resources, such as law enforcement agents and medical professionals. Instead of an unexpected incident, the system may be operational over a scheduled event, such as a game at a sports complex and a floor waxing job at a shopping mall.

FIG. 1 is an environment diagram illustrating an example environment where a system for real-time incident control and site management can be implemented. The system is typically deployed at a command center 102 and operated by one or more commanders. For example, a commander could be an owner of a site, a director of operations of the site, a staff member of a security company in charge of guarding the site, and the like. The system maintains communication channels between the commanders and parties present at a site 108 during a specific period of time (hereinafter "involved parties"), which might have designated start and end dates during which specific incidents might occur or might correspond to the occurrence of an individual incident or event onsite. For example, a site can be a school, a shopping mall, or any location. An event can be a relay race, a Christmas sale, or a floor-waxing job, for example. An incident can be the receipt of a counterfeit bill, a robbery, a shooting, etc. The involved parties may include people who are regularly present at the site (hereinafter "likely participants") and other people, such as police officers who have arrived at the site to deal with the incident or event. The system may handle multiple, independent sites 108 at the same time. To facilitate incident control and site management, the system allows the commanders to visualize the status of the site at various granularities. During the specific period of time, the system may also establish communication channels between the commanders and agents at support agencies 104, such as law enforcement agencies and agencies entrusted with maintaining or securing the site, for handling crises and various adverse circumstances, and between the commanders and designated contacts of the involved parties at respective locations 106 for notification purposes. The system also logs all the communications for subsequent review and analysis.

The system may be implemented by one or more computing devices, including a computer server and a cloud computing environment. In some embodiments, it provides graphical user interfaces that can be accessed by remote devices, such as a tablet and a cellular phone. In some embodiments, it offers an application programming interface which enables the system to be accessed at an application level. In some embodiments, the system accepts and transmits text messages, voicemail messages and email messages for communication between the commanders and various parties over computer networks, telephone networks, mobile networks, or other networks.

Figure 2:
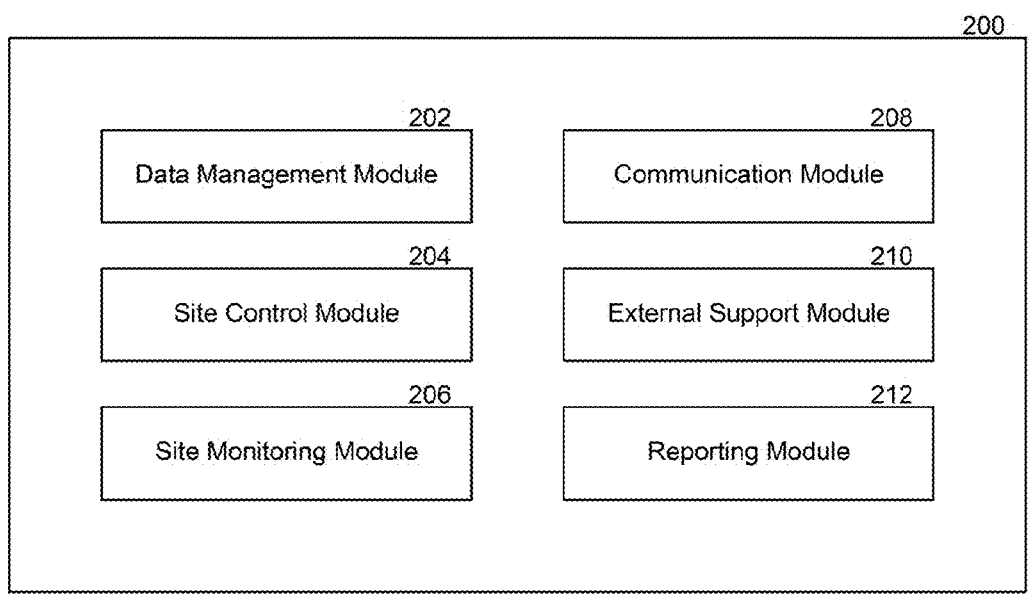
FIG. 2 is a block diagram illustrating example components of the system for real-time incident control and site management.

FIG. 2 is a block diagram illustrating example components of the system for real-time incident control and site management. The system 200 comprises a data management module 202, a site control module 204, a communication module 208, a site monitoring module 206, an external support module 210, and a reporting module 212.

The data management module 202 accepts data inputted by users of the system or received from third-party sources and stores them in one or more databases. In some embodiments, the data management module 202 accepts data regarding a site. One example of such data is a floor plan showing the layout of a site, which may indicate the locations of landmarks, the features of individual rooms, and the like. The data management module 202 allows such data to be represented in a hierarchical manner. For example, the top level may correspond to the entire site, the second level may correspond to individual buildings at the site, the third level may correspond to individual rooms within each building, and so on.

In some embodiments, the data management module 202 accepts data regarding the likely participants. For example, when the site is a school, the likely participants include all employees of the school, such as teachers and administrators, and all students who attend the school. Such data may contain a variety of types of information, including information identifying a person, such as the person's name, gender, age, title, and phone number, and information indicating the person's special needs, such as using a wheelchair or having asthma.

Figure 3:
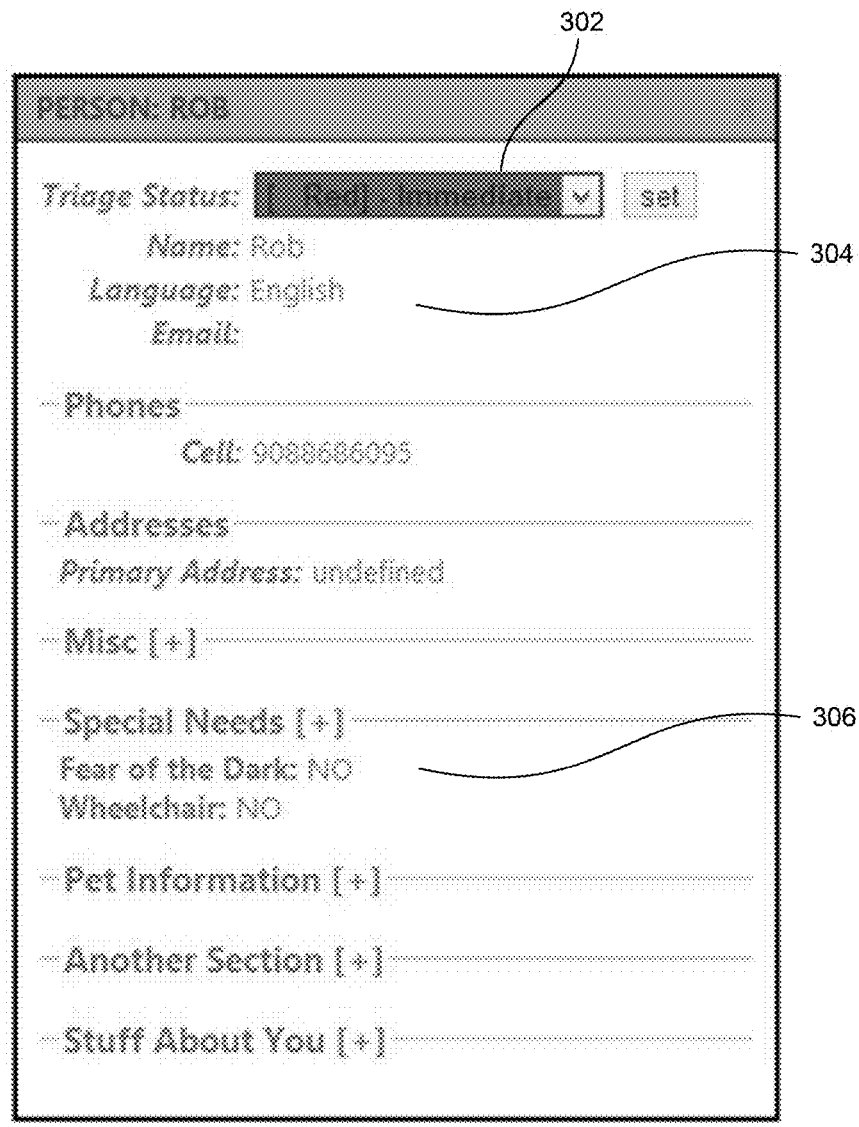
FIG. 3 is a user interface diagram illustrating an example user interface for managing data regarding a likely participant.

FIG. 3 is a user interface diagram illustrating an example user interface for managing data regarding a likely participant. The user interface shows information identifying a likely participant in 304, including the person's name, primary language, email address, phone numbers, and addresses. It also shows information indicating the person's likely special needs in 306, including the need for a wheelchair, any vision impairment, or whether an interpreter is required. Many other types of information may be displayed, especially information relevant to anticipated events or potential incidents. During an incident or event, the user interface may also display the likely participant's status in 302, such as safe or bleeding and thus requiring attention immediately, when that status is available based on communications with the likely participant or a representative thereof.

In some embodiments, the data management module 202 accepts data regarding the support agencies. Such data may include information identifying an agency or trusted party, such as a police department, or security service, potentially including its location and contact mechanisms, and information specifying capabilities of the agency or the trust, such as information regarding the officers and the weapons available. The data management module 202 also accepts data regarding emergency contacts of the likely participants, including information identifying an emergency contact's name, phone numbers, or email addresses.

The communication module 208 manages all communication with the involved parties. In some embodiments, the communication module 208 specifies system accessibility information. For example, it may make one phone number or email address available for all incoming messages, or it may make one unique phone number or email address available to each site. Furthermore, the communication module 208 accepts incoming telephone calls and voicemail, email, text and other messages from the involved parties and delivers outgoing ones to the involved parties. It may present all the conversations graphically in real time to the commanders.

In some embodiments, the communication module 208 defines communication protocols for specific communications with the involved parties. A communication protocol may comprise a series of questions to be answered by the involved parties. Instead of a series of questions, a protocol may also specify merely one or more keywords.

One communication protocol is for a check-in procedure to be followed by appropriate parties, which produces an estimated list of involved parties in each unit of a site. As one example, when the appropriate parties are representatives of the likely participants, the questions may involve asking a representative in a unit of a site, such as a teacher in a classroom, to report on other members in that unit, such as the students and first responders in that classroom. As another example, when the appropriate parties are all the likely participants, a keyword may be "present", and every likely participant who sends a message containing that keyword would be considered checked in. Another communication protocol is for a triage or status report procedure, which produces a summary of the situation in each unit of a site. As one example, the questions may involve the locations of the involved parties within a unit, the types of injuries sustained by the involved parties in the unit, the sights and sounds outside the unit that could be observed by the involved parties in the unit, and the like. As another example, the keywords may be "status" and one of a set of status indicators, such as "secured", hazard", and "critical" for an incident, "idle", "operating", "on-break" for a project or event, and "normal", "counterfeit", "stealing", "excessive returns" for general monitoring.

FIG. 4 is a diagram illustrating an example communication protocol for a check-in procedure. In this example, the communication protocol consists of four questions or requests for answers, each one to be raised after the answer to the previous question is received. The first question 401 is for determining where and specifically which unit of a site a party checking in is located. The second question 402 is for determining whether the party checking in or anyone under the care of the party checking in is injured. The third question 403 is for identifying the number of involved parties who are under the care of the party checking in. The last question 404 for identifying the overall status of the unit of the site where the party checking in is located.

The site control module 204 manages a process of controlling a site. In some embodiments, the site control module 204 allows a user to set up trigger conditions that would lead to the initiation of the control process, especially a lockdown of the site in a crisis or any other adverse scenarios. One type of trigger condition is the receipt of a message from a relevant party, such as a likely participant or a law enforcement agent, containing a set of keywords. The site control module 204 may define default measures or allow a user to specify such measures corresponding to one or more trigger conditions. One type of measure is the initiation of a site lockdown by sending a message to appropriate parties, whether they are representatives of the likely participants or all the likely participants. Another type of measure is the notification of relevant parties, such as the support agencies and emergency contacts of the likely participants. For non-emergency situations, such as day-to-day monitoring or a scheduled event, no triggering might be defined, and the site control module 204 might simply initiate the control process at the instruction of a commander, for example.

As one example, when the communication module 208 makes a single phone number available, a trigger condition may specify the name of a school and the word "shooting", and a corresponding measure may be the initiation of a lockdown of the school. As a result, upon receiving from a teacher in a classroom of a school a message including the name of the school and the word "shooting", the site control module 204 would initiate a lockdown of the school by sending a message which states "Lockdown initiated!" to appropriate parties. As another example, when the communication module 208 makes multiple phone numbers available, one for each site, a trigger condition may specify a single word "robbery." As a result, when an owner of a shop in a mall sends a message to the phone number assigned to the mall which contains the word "robbery", the site control module 204 would similarly initiate a lockdown of the mall.

Figure 5:
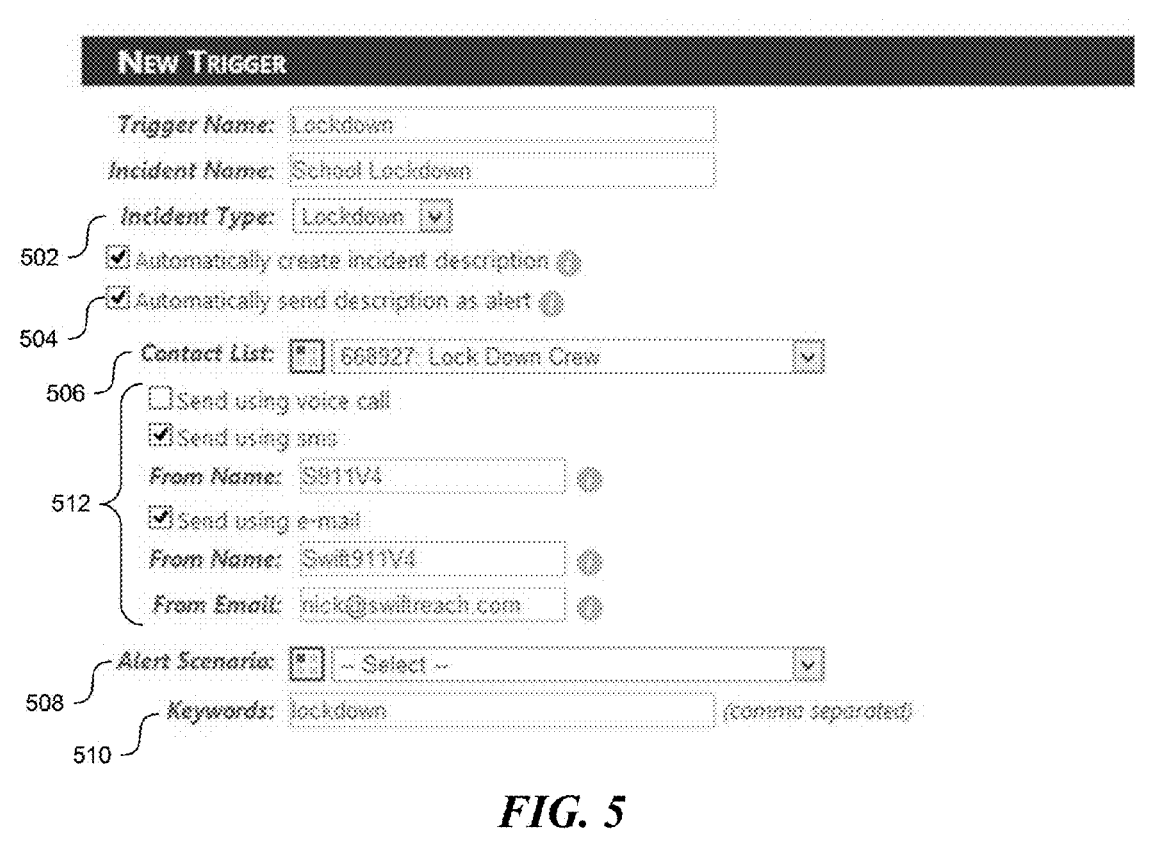

FIG. 5 is a user interface diagram illustrating an example user interface for managing a trigger for the management of an incident or an event in general. The user interface allows a user to enter an incident type in 502, which can be a lockdown indicating an urgent incident, a job, an event, and so on. It allows a user to enter a trigger condition represented by an alert scenario in 508 and a set of keywords in 510. An alert scenario typically represents an action or series of actions to be taken to respond to a trigger condition. The action or actions typically include one or more alerts or notifications to parties. For example, an alert scenario triggered by a gas leak may include alerts to the fire department, the gas company, a lockdown of nearby buildings, and alerts to nearby pedestrians. Different triggers may result in the same action or series of actions to take place. The interface allows for a selection of an alert scenario, 508, setting forth the action or actions to take place in response to the scenario. FIG. 5 depicts one method of associating an alert scenario with a trigger, with an alert scenario dropdown box through which a user may select an alert scenario that was defined using a separate interface. Alert scenarios can be reused and consistently defined and modified without requiring separate maintenance of the actions to take in response to each trigger. Using the user interface, the user may specify which keywords will invoke the trigger. FIG. 5 also depicts Keywords 510, which provides the ability to identify keywords that will invoke this trigger. More than one keyword can be entered. For example, "lockdown" and "gunman" are potential keywords that the user may use to cause the same trigger to execute. For example, the user may directly create a textual message, for example in an email or text message, such as an SMS or MMS message, iMessage, tweet, or another messaging service, or the user's speech may be transcribed through an automatic or manual process. That textual message may then be searched to determine if any of the trigger keywords are present. Using the user interface, the user may also specify certain measures to be immediately taken when the trigger condition is met. In this example, it allows a user to select an option of automatically alerting certain parties in 504, specify the certain parties in 506, and specify the mechanisms of delivering the alerts in 512, such as sending SMS messages as well as email messages.

In some embodiments, the site control module 204 carries out a check-in procedure according to a communication protocol defined by the communication module 208. As one example, it may reach out to every likely participant to carry out the check-in procedure right after it initiates a site lockdown. As another example, after announcing a site lockdown, it may carry out the check-in procedure with an involved party in response to receiving a message from the involved party directly or through a sensor installed onsite which may detect the presence of an involved party. In some embodiments, the site control module 204 concludes a process of controlling a site by sending a message to appropriate parties. For example, the message may be as simple as "Lockdown terminated!" or "Operation complete!."

The site monitoring module 206 keeps track of the status of a site. In some embodiments, it determines the status of each unit of the site using various approaches. In one approach, the site monitoring module 206 identifies a status from an incoming message that satisfies a communication protocol for a status report procedure. In another approach, for a set of status indicators, the site monitoring module 206 associates each of them with an additional set of keywords. It then analyzes the incoming messages and assigns a status to a unit based on the presence of the keywords. For example, for the status indicator "hazard", the associated keywords may include "hostile" and "broken", and for the status indicator "critical", the associated keywords may include "bleeding" and "shot." Therefore, when the words "bleeding" and "shot" appear frequently in the messages received from the involved parties in a particular unit of a site, the site monitoring module 206 may assign the status "critical" to that unit. In addition to a status indicator, the site monitoring module 206 may record descriptions of specific issues that have arisen in a unit. For example, the presence of each of the keywords associated with a status indicator may lead to a description of a specific issue. When a specific issue concerns a specific involved party, the site monitoring module 206 may update the status of that involved party, which may then be displayed by the data management module 202.

Figure 6:
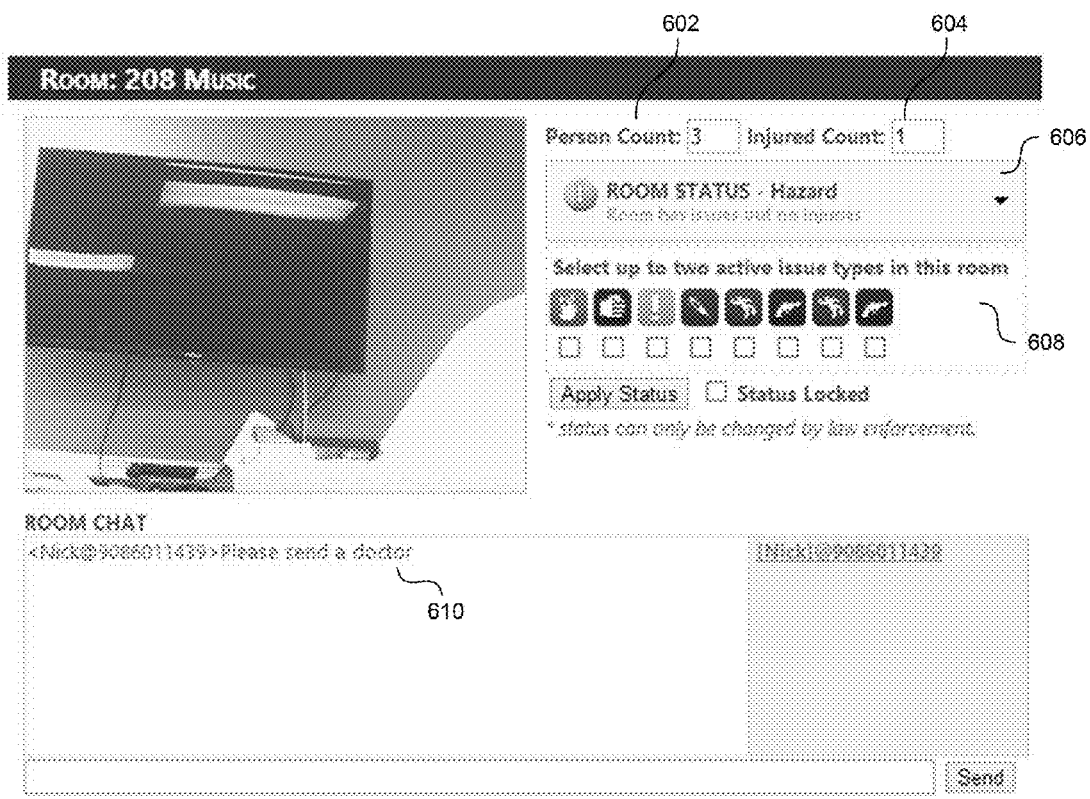
FIG. 6 is a user interface diagram illustrating an example user interface for managing status descriptions of a unit of a site, such as a room.

FIG. 6 is a user interface diagram illustrating an example user interface for managing status descriptions of a unit of a site, such as a room. The user interface allows a user to enter the total number of people known to be in the room in 602 and the total number of those people known to have been injured in 604. It also allows a user to identify some of the predefined issues that have occurred in the room in 608, such as fire, fight, drugs, and shooting. In addition, the user interface shows communications made with the involved parties in this room in 610. These communications can directly identify or be used to deduce the general status of the room displayed in 606 and the specific issues displayed in 608, while the user interface also allows a user to manually override the displayed information.

In some embodiments, the site monitoring module 206 represents the status of the site graphically. When the floor plan of the site is available, the site monitoring module 206 presents an annotated, interactive version of the floor plan. For example, each unit of the site may be shown in a color that corresponds to the status indicator of the unit, and a user's interaction with the graphical representation of the unit may lead to the display of further information about the unit.

Figure 7:
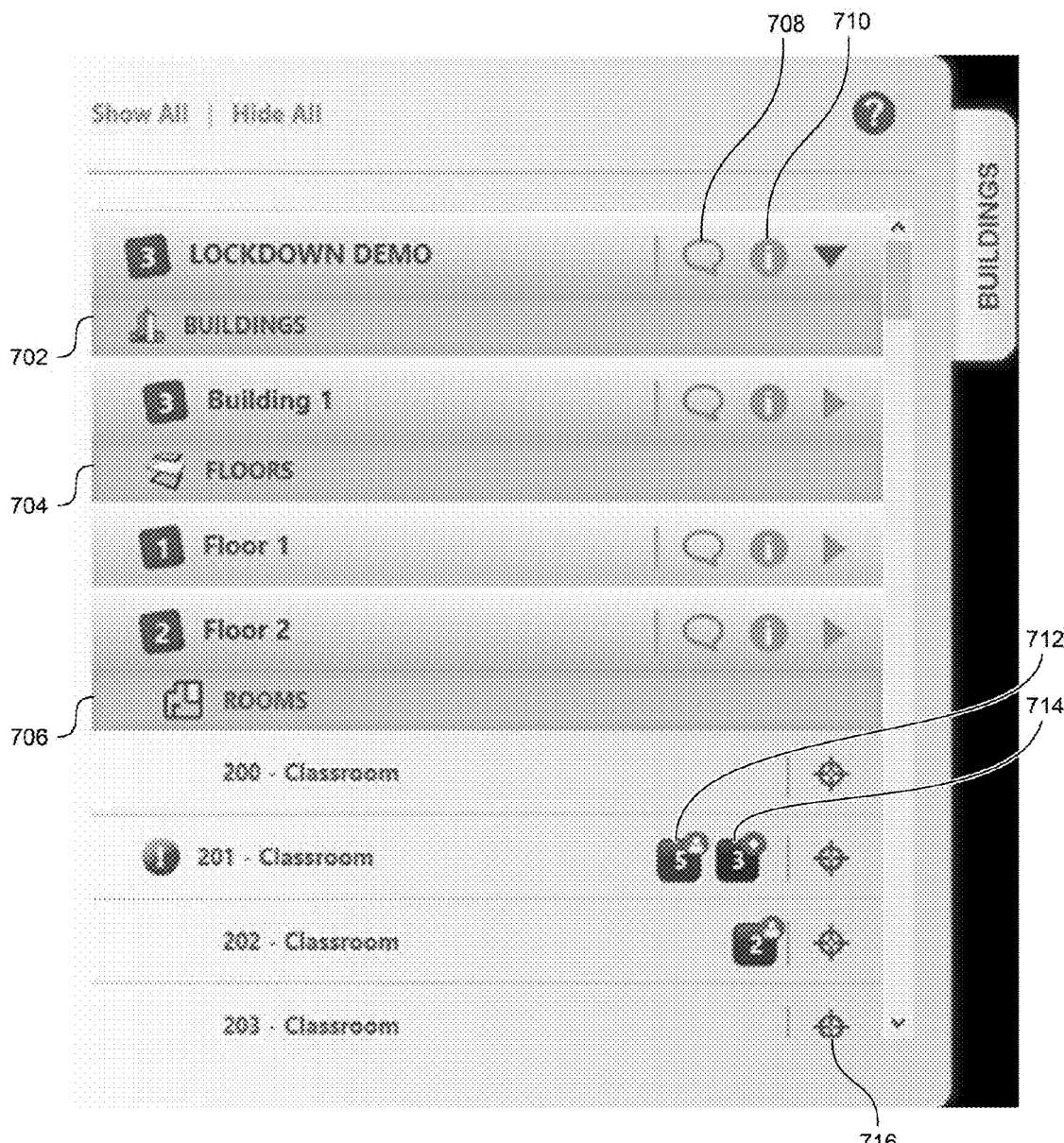
FIG. 7 is a user interface diagram illustrating an example user interface for monitoring the overall status of a site.

FIG. 7 is a user interface diagram illustrating an example user interface for monitoring the overall status of a site. The user interface presents information according to the hierarchical structure of the site. Therefore, it shows information at the building level in 702, information at the floor level in 704, and information at the room level in 706. For the lowest level or the room level in this case, the user interface shows a summary of the general status, such as the total number of people known to be in the room in 712 and the total number of those people known to have been injured in the room in 714. It also allows a user to examine room details via 716. For each of the other levels, the user interface allows a user to obtain information regarding the site at that level via 710. It also allows a user to communicate with the involved parties at that level via 708, such as broadcasting a message to all the involved parties on a particular floor of a particular building.

Figure 8:
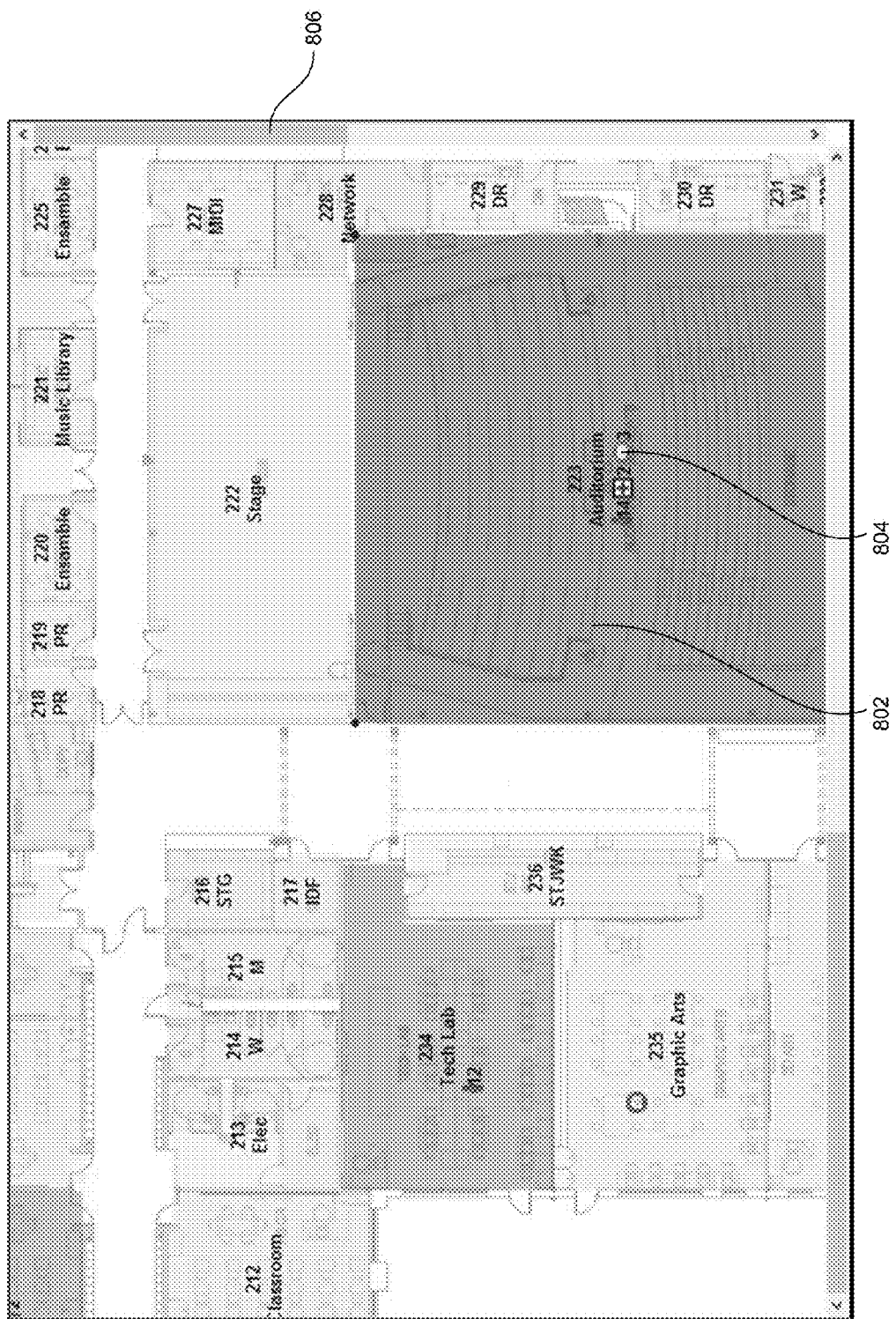
FIG. 8 is a user interface diagram illustrating an example user interface for monitoring the overall status of a site.

FIG. 8 is a user interface diagram illustrating another example user interface for monitoring the overall status of a site. The user interface corresponds to a floor plan for a site. In this example, a site has several buildings, one of which includes rooms 222 Stage and 223 Auditorium. The user interface shows each of the rooms in a way that reflects its current general status using various approaches. One approach is to color-code the displays of the different rooms using the colors assigned to the different status indicators. In this example, room 223 is shown in a darker color of 802 which may be assigned to a more urgent status. Another approach is to show some summary statistics as in 804, including the total number of people known to be in the room. The user interface may allow a user to perform scrolling via 806, zooming, and other operations to properly observe the status of a particular area of the site. Furthermore, the user interface may also allow a user to drill into additional room details, by clicking on the display of the room, for example. The room details may include the location of doors and windows, the availability of video cameras, speakers, first-aid kits, and so on; they may be especially useful when the floor plan itself does not contain sufficient details. This user interface and the one illustrated in FIG. 7 together provide a rich and user-friendly view of an entire site, enabling swift and proper allocation of support resources direction of the involved parties in incident handling and site management.

The external support module 210 facilitates the coordination of support efforts from one or more support agencies, such as law enforcement agencies, regarding an incident at a site. For example, it may receive telephone calls or messages from several police departments near a site regarding 911 calls made by the involved parties. The external support module 210 may set up a written record for each piece of information received. Furthermore, it may share the received information among the support agencies who have shared such information, with the involved parties, and with other relevant parties. It may also provide information available within the system 200 to the support agencies, such as data regarding the involved parties. In this manner, the external support module 210 serves as a point of contact for all incident-handling efforts, ensuring that no effort is duplicated and all the efforts are integrated to achieve the maximum effect.

Figure 9:
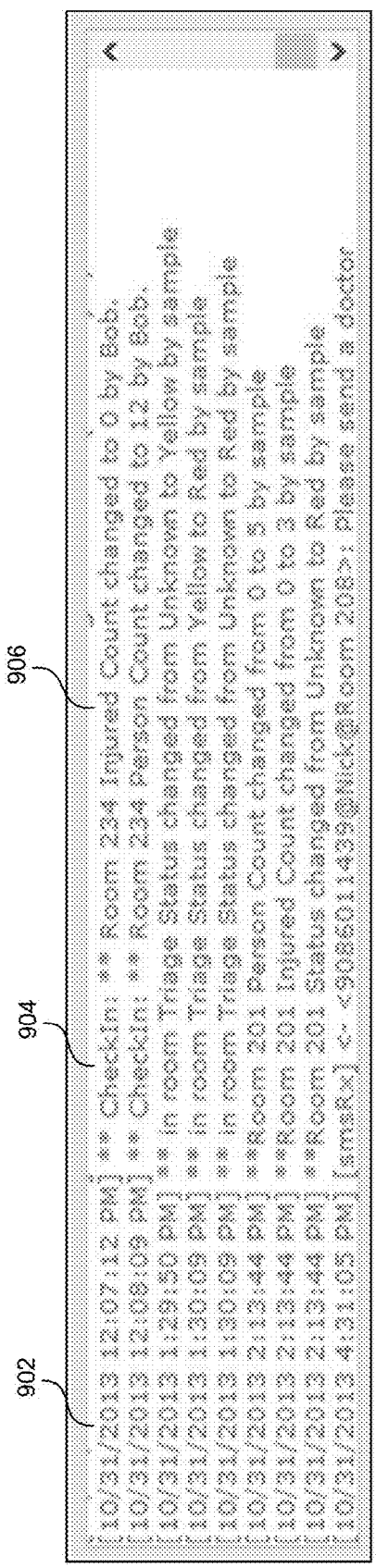
FIG. 9 is a user interface diagram illustrating an example user interface for managing a log.

The reporting module manages data that may be used for audit purposes. In some embodiments, the reporting module 212 manages a log to account for all the communications conducted during the process of controlling a site. For example, the log may include a time-stamped entry for every incoming and outgoing message and telephone call. It may also include descriptions of important checkpoints, such as when the status of a room changes. FIG. 9 is a user interface diagram illustrating an example user interface for managing a log. In this example, each log entry shows a time stamp in 902, a type of activity being logged if available, such as a check-in or a room status change, and a description, such as a summary of the activity or entire contents of an incoming or outgoing message.

In some embodiments, the reporting module 212 replays the log in a graphic or animated manner with respect to a timeline for the control process using the time stamps. For example, it may display the communications differently based on the source or destination of a communication, the type of a communication, the keywords mentioned in a communication, the length of the communication, and so on.

In some embodiments, the reporting module 212 extracts various types of information from the log. One type of information is an accountability list, showing a list of involved parties who have gone through the check-in procedure, for example. FIG. 10 is a user interface diagram illustrating an example user interface for managing an accountability list. The user interface shows an entry for each involved party. In this example, each entry shows the name of the involved party in 1002, the triage status of the involved party in 1004, such as safe, bleeding or unconscious, and the location of the involved party in 1006.

Figure 11:
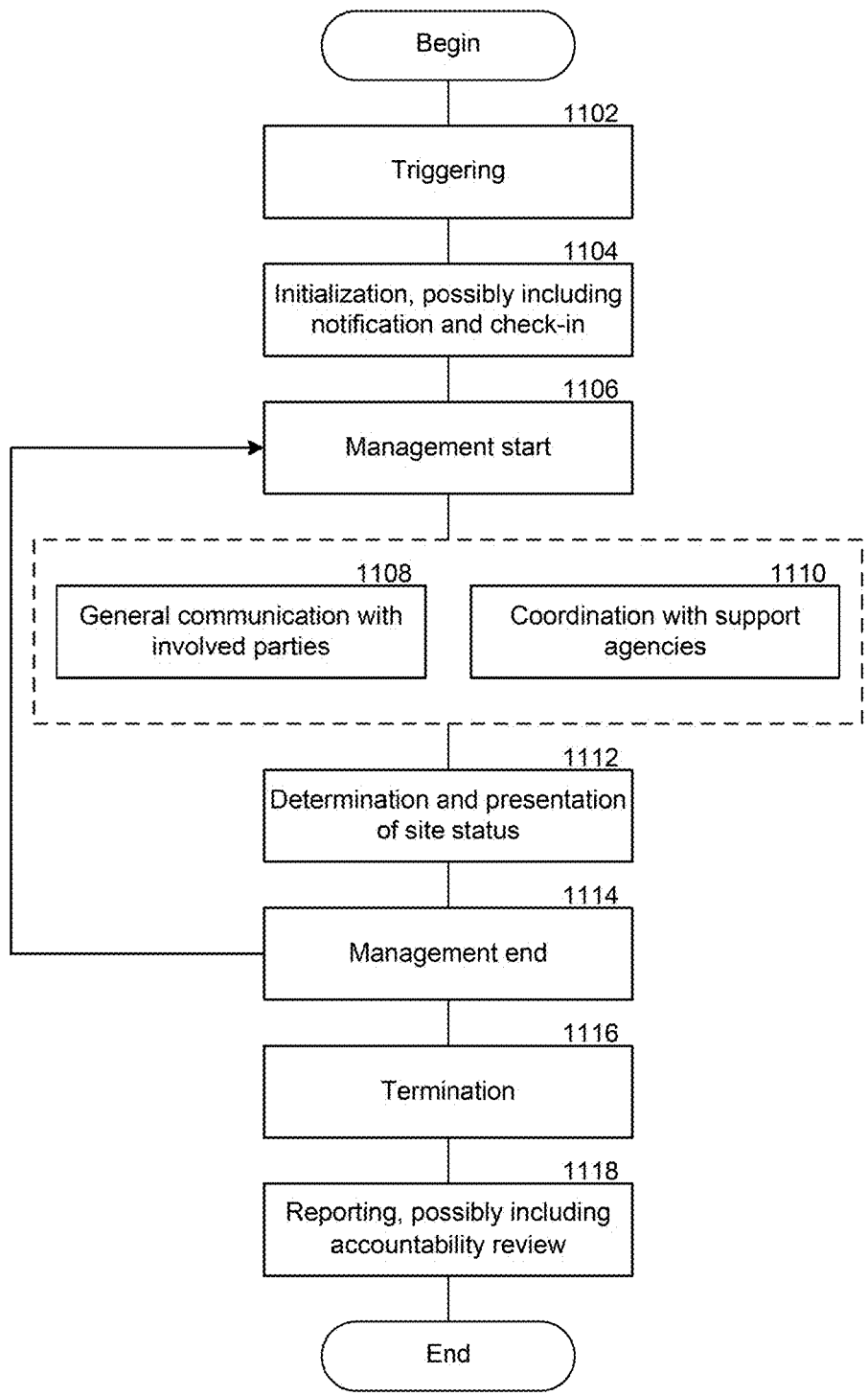
FIG. 11 is a flow diagram illustrating an example process of a lockdown.

FIG. 11 is a flow diagram illustrating an example process of a site lockdown. At block 1102, a lockdown is triggered when a trigger condition is met. At block 1104, the system control module 204 initiates the lockdown and takes other responsive measures, such as notifying law enforcement agencies and checking in likely participants. Blocks 1106-1114 correspond to the management of the lockdown in an iterative manner. At block 1108, the communication module 208 handles all incoming and outgoing communications with the involved parties in terms of email messages, text messages, and so on. At block 1110, the external support module 210 coordinates with the support agencies in the meantime. At block 1112, based on the output of the communication module 208 and the external support module 210, the site monitoring module 206 determines the status of the site and presents the status to a user. As new data is produced by the communication module 208 and the external support module 210, the site monitoring module 206 updates the status information and redisplays the status to a user. As new status is displayed to a user, new data and directions can be communicated to the involved parties and the external support agents. At block 1116, the site control module 204 terminates the lockdown. At block 1118, the reporting module 212 produces auditable data, including an accountability list of the involved parties.

Figure 12:
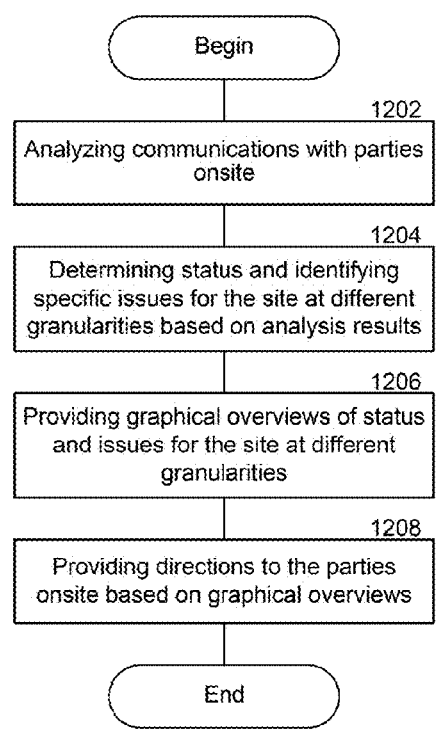
FIG. 12 is a flow diagram illustrating an example process of managing a site.

FIG. 12 is a flow diagram illustrating an example process of managing a site. At block 1202, the site monitor module 206 analyzes the communications with involved parties. At block 1204, it determines the general status and identifies pertinent issues for different structural levels of the site. At block 1206, it presents the determined information to a user in a multi-dimensional and easy-to-understand manner. At block 1208, it issues directions to the involved parties according to a user's instruction based on the review of the presented information.

Figure 13:
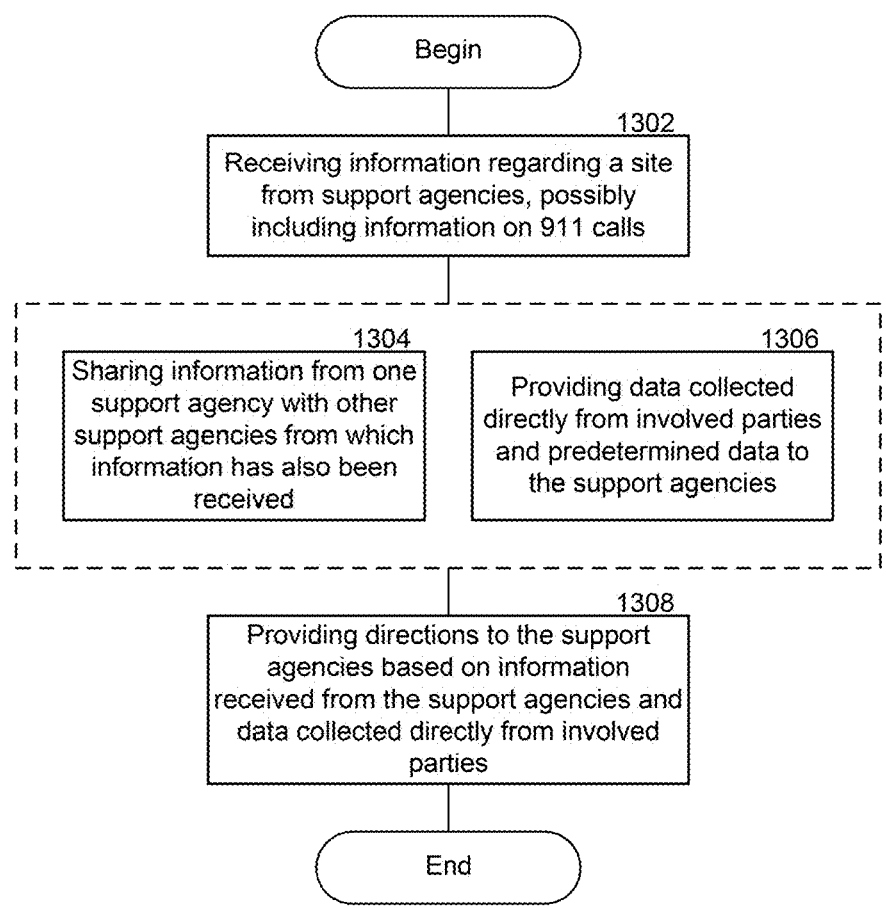
FIG. 13 is a flow diagram illustrating an example process of coordinating with support agencies.

FIG. 13 is a flow diagram illustrating an example process of coordinating with the support agencies. At block 1302, the external support module 210 receives information regarding a site from one or more support agencies, such as information on 911 calls made to the police departments near the site. At block 1304, the external support module 210 shares information received from one support agency among all the support agencies. At block 1306, the external support module 210 also offers the support agencies data it has obtained from communication with the involved parties as well as additional pre-collected data, such as information on the special needs of an involved party. At block 1308, the external support module 210 issues directions to the support agencies according to a user instruction based on the information received from the support agencies as well as information obtained from the involved parties.

Figure 14:
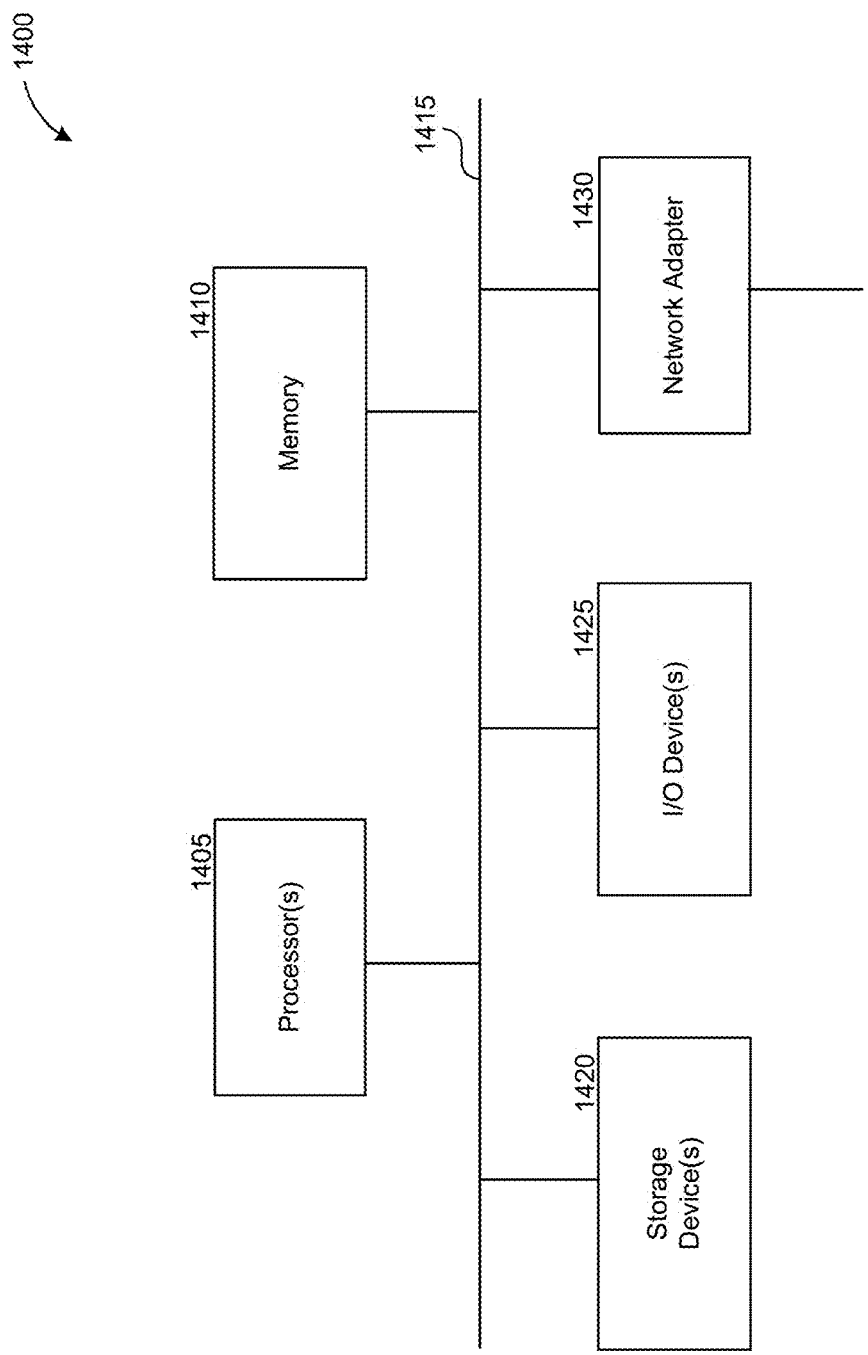
FIG. 14 is a block diagram illustrating example components of a computer system that may be used to implement various features of the embodiments.

FIG. 14 is a block diagram illustrating example components of a computer system that may be used to implement various features of the embodiments. The computing system 1400 may include one or more central processing units ("processors") 1405, memory 1410, input/output devices 1425 (e.g., keyboards, pointing devices, monitors, display devices), storage devices 1420 (e.g., disk drives), and network adapters 1430 (e.g., network interfaces) that are connected to an interconnect 1415. The interconnect 1415 is illustrated as an abstraction that represents any one or more separate physical buses, point to point connections, or both connected by appropriate bridges, adapters, or controllers. The interconnect 1415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 1410 and storage devices 1420 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non transitory" media) and computer-readable transmission media.

The instructions stored in memory 1410 can be implemented as software and/or firmware to program the processor(s) 1405 to carry out actions described above. In some embodiments, such software or firmware may be initially provided to the processing system 1400 by downloading it from a remote system through the computing system 1400 (e.g., via network adapter 1430).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method performed by an incident management system of monitoring and controlling an incident taking place at a site across a plurality of units of the site in real time, comprising:

initiating incident management of the site;

receiving, by the incident management system, information regarding parties from mobile devices that are located together with the parties in the units during the incident management, wherein the mobile devices receive the information from the parties in the units and transmit the information to the incident management system in real time, and wherein the information is related to estimating a number of parties in each of the units or determining whether any party requires medical attention in each of the units;

presenting a user interface that displays an overall status of the site, wherein the user interface presents the information regarding the parties in a hierarchical structure of one or more floor plans associated with the site;

presenting a graphical overview of the site that reflects the one or more floor plans of the site in response to a selection of the one or more floor plans presented by the user interface, wherein the graphical overview of the site shows a current status for each of the units, including the number of parties in the unit or whether any party requires medical attention in the unit;

automatically re-presenting the graphical overview or the user interface in real time in response to receiving additional information regarding the parties in the units from the mobile devices; and terminating the incident management of the site according to a user instruction.

2. The method of claim 1, further comprising:
receiving a triggering event for the incident management,
wherein the incident management is initiated in response to the triggering event.

3. The method of claim 2, wherein the triggering event is a text message, a voicemail message, an email message, a phone call or entering a command using a user interface presented via a software application or web browser.

4. The method of claim 1, wherein initiating the incident management includes sending notifications to devices of parties who are likely to be at the site.

5. The method of claim 1, wherein initiating the incident management includes sending notifications to devices of law enforcement agencies, other agencies entrusted with securing the site, or emergency contacts of parties who are likely to be at the site.

6. The method of claim 1, wherein initiating the incident management includes performing a check-in protocol with the mobile devices in the units.

7. The method of claim 1, wherein the information received from the mobile devices includes one or more of text messages, voicemail messages, email messages or phone calls.

8. The method of claim 1,
wherein the receiving is performed in accordance with a communication protocol including information elements, and wherein a first of the information elements is for determining in which unit of the site one of the parties is located, a second of the information elements is for determining whether the one party or anyone under a care of the one party in the determined unit is injured, a third of the information elements is for identifying a number of parties who are under the care of the one party, and a fourth of the information elements is for identifying a status of the determined unit.

9. The method of claim 1, further comprising:
communicating with systems of support agencies, including law enforcement agencies or other agencies entrusted with securing the site, in assisting with the parties in the units, wherein the current status of each unit also includes information gathered during the communication with the systems of the support agencies.

10. The method of claim 1, wherein the graphical overview shows the status of a unit by displaying a representation of the unit in one of a plurality of colors.

11. The method of claim 1, wherein the graphical overview facilitates user interaction via a displayed representation of a unit to obtain status details for the unit; and facilitates initiation of two-way communication between the user and one or more parties within the unit.

12. The method of claim 1, wherein terminating the incident management includes sending notifications to devices of parties who are likely to be at the site.

13. The method of claim 1, wherein terminating the incident management includes sending notifications to devices of the law enforcement agencies, other agencies entrusted with securing the site, or emergency contacts of parties who are likely to be at the site.

14. The method of claim 1, wherein terminating the incident management includes generating an accountability list of the parties onsite.

15. The method of claim 1, further comprising:
maintaining a log of all activities taking place during the incident management; and
presenting a graphical replay of the log after the incident management.

16. A system for managing a site where an incident is taking place across a plurality of units of the site in real time, comprising:

an initiation unit configured to initiate incident management of the site;

a communication unit configured to communicate with mobile devices that are located together with parties in the units to obtain information from the parties throughout the incident management, wherein the communication unit stores and updates a current number of parties in each of the units or current information regarding whether any party requires medical attention in each of the units based on the information obtained from the parties in communicating with the mobile devices at different times;

a graphing unit configured to:
present a user interface that displays an overall status of the site in a hierarchical structure of one or more floor plans associated with the site;
present, in response to a selection of the one or more floor plans presented by the user interface, a graphical overview of the site that shows:
a floor plan representation of the site that depicts a layout of each of the units at the site, and
a current status for each of the units of the site;

receive a user specification of one of the units via the graphical overview or the user interface that displays the overall status, and show detail of the current status for the specified unit in the graphical overview, including the current number of parties in the unit or the current information regarding whether any party requires medical attention in the unit; and a termination unit configured to terminate the incident management of the site according to a user instruction.

17. The method of claim 1, wherein the incident management corresponds to an occurrence of an incident or an event at the site.

18. The method of claim 1, wherein the incident management involves a lockdown.

19. A non-transitory computer-readable medium whose contents, when executed by an incident management system, cause the incident management system to perform a method for monitoring and controlling occurrence of an incident at a site across a plurality of units of the site in real time, the method comprising:

initiating incident management of the site;

receiving, by the incident management system, information regarding parties from mobile devices that are located together with the parties in the units during the incident management, wherein the mobile devices receive the information from the parties in the units and transmit the information to the incident management system in real time, and wherein the information is related to estimating a number of parties in each of the units or determining whether any party requires medical attention in each of the units;

presenting a user interface that displays an overall status of the site, wherein the user interface presents the information regarding the parties in a hierarchical structure of one or more floor plans associated with the site;

presenting a graphical overview of the site that reflects the one or more floor plans of the site in response to a selection of the one or more floor plans presented by the user interface, wherein the graphical overview of the site or the user interface shows a current status for each of the units, including the number of parties in the unit or whether any party requires medical attention in the unit;

automatically re-presenting the graphical overview in real time in response to receiving additional information regarding the parties in the units from the mobile devices; and terminating the incident management of the site according to a user instruction.

20. The non-transitory computer-readable medium of claim 19, wherein the graphical overview facilitates user interaction via a displayed representation of a unit to obtain status details for the unit.

21. The non-transitory computer-readable medium of claim 19, wherein the graphical overview facilitates initiation of two-way communication between the user and one or more parties within a unit via a displayed representation of the unit.

* * * * *